United States Patent
Ye et al.

(10) Patent No.: US 9,052,778 B2
(45) Date of Patent: Jun. 9, 2015

(54) INFRARED TOUCH SCREEN

(75) Inventors: Xinlin Ye, Beijing (CN); Jianjun Liu, Beijing (CN); Xinbin Liu, Beijing (CN)

(73) Assignee: BEIJING IRTOUCH SYSTEMS CO., LTD, Beijing (CN)

( * ) Notice: Subject to any disclaimer, the term of this patent is extended or adjusted under 35 U.S.C. 154(b) by 190 days.

(21) Appl. No.: 13/515,751

(22) PCT Filed: Dec. 10, 2010

(86) PCT No.: PCT/CN2010/079646
§ 371 (c)(1),
(2), (4) Date: Jun. 13, 2012

(87) PCT Pub. No.: WO2011/072588
PCT Pub. Date: Jun. 23, 2011

(65) Prior Publication Data
US 2012/0249485 A1    Oct. 4, 2012

(30) Foreign Application Priority Data
Dec. 16, 2009   (CN) .................... 2009 2 02779575 U

(51) Int. Cl.
*G06F 3/042* (2006.01)
*G06F 3/03* (2006.01)

(52) U.S. Cl.
CPC ............ *G06F 3/0421* (2013.01); *G06F 3/0423* (2013.01); *G06F 3/042* (2013.01); *G06F 3/0304* (2013.01); *G06F 3/0325* (2013.01); *G06F 3/0428* (2013.01)

(58) Field of Classification Search
USPC ........................................................ 345/173
See application file for complete search history.

(56) References Cited

U.S. PATENT DOCUMENTS

| | | | | |
|---|---|---|---|---|
| 4,128,760 A | * | 12/1978 | Del Signore, II | 250/214 B |
| 4,198,623 A | * | 4/1980 | Misek et al. | 345/175 |
| 4,591,710 A | * | 5/1986 | Komadina et al. | 250/221 |
| 4,713,534 A | * | 12/1987 | Masters et al. | 250/214 B |
| 4,719,339 A | * | 1/1988 | Mizuno | 250/221 |
| 4,855,590 A | * | 8/1989 | Bures et al. | 250/221 |
| 5,414,413 A | * | 5/1995 | Tamaru et al. | 345/175 |
| 5,605,406 A | * | 2/1997 | Bowen | 400/472 |
| 6,495,832 B1 | * | 12/2002 | Kirby | 250/341.7 |
| 2009/0135162 A1 | * | 5/2009 | Van De Wijdeven et al. | 345/175 |

FOREIGN PATENT DOCUMENTS

| | | |
|---|---|---|
| CN | 101067775 | 11/2007 |
| CN | 101551729 | 10/2009 |

* cited by examiner

*Primary Examiner* — Temesgh Ghebretinsae
*Assistant Examiner* — Michael J Jansen, II
(74) *Attorney, Agent, or Firm* — Harness, Dickey & Pierce, P.L.C.

(57) ABSTRACT

This invention provides an infrared touch screen, comprising: a touch detecting region; a plurality of edges containing at least a first edge and a second edge, wherein the first edge and the second edge are opposite to each other, there are infrared emitters and infrared receivers fixed on the first edge and there are infrared emitters and infrared receivers fixed on the second edge; and a phase managing mechanism configured to control the phase alternation of the infrared touch screen which has a plurality of phases containing at least a first phase and a second phase. With the structure change and phase managing mechanism application in this infrared touch screen, the light interference caused by varying ambient light can be reduced or eliminated effectively.

9 Claims, 12 Drawing Sheets

INFRARED TOUCH SCREEN

FIELD OF THE INVENTION

This invention relates to a touch screen, and more particularly relates to an infrared touch screen that may resist light interference.

BACKGROUND OF THE INVENTION

Along with science and technology development, human-computer interaction devices are more and more widely used-spread in daily life, such as touch screens, electronic whiteboards, etc, one kind of which is infrared touch screens. Because ambient light changes instantly in various location and time, it causes light interference while the infrared receivers in infrared touch screens are receiving the infrared light emitted from the corresponding infrared emitters, which influences the detecting precision of infrared touch screens. This is an urgent issue to be solved.

SUMMARY OF THE INVENTION

In view of the above issue in the existing techniques, this invention provides an infrared touch screen that may resist light interference, comprising:

a touch detecting region;

a plurality of edges containing at least a first edge and a second edge, wherein the first edge and the second edge are opposite to each other, there are infrared emitters and infrared receivers fixed on the first edge, and there are infrared emitters and infrared receivers fixed on the second edge; and a phase managing mechanism, configured to control the phase alternation in said infrared touch screen which has a plurality of phases containing at least a first phase and a second phase;

wherein the phase managing mechanism controls the infrared emitters fixed on said first edge and the infrared receivers fixed on said second edge to scan said touch detecting region in said first phase; and the phase managing mechanism controls the infrared receivers fixed on said first edge and the infrared emitters fixed on said second edge to scan said touch detecting region in said second phase.

According to one aspect of the invention, said plurality of edges further include a third edge and a fourth edge, wherein said third edge and said fourth edge are opposite to each other, there are infrared emitters fixed on said third edge, and there are infrared receivers fixed on said fourth edge.

According to one aspect of the invention, said plurality of edges further includes a third edge and a fourth edge, wherein said third edge and said fourth edge are opposite to each other, there are infrared receivers fixed on said third edge, and there are infrared emitters fixed on said fourth edge.

According to one aspect of the invention, a standard ambient light intensity is preset in said phase managing mechanism;

in said first phase, if the intensity of the ambient light received in said infrared receivers fixed on said second edge is not larger than said standard ambient light intensity, said phase managing mechanism controls said infrared touch screen to maintain the first phase; if the intensity of the ambient light received in said infrared receivers fixed on said second edge is larger than said standard ambient light intensity, said phase managing mechanism controls said infrared touch screen to terminate the first phase and enter into the second phase; and in said second phase, if the intensity of the ambient light received in said infrared receivers fixed on said first edge is not larger than said standard ambient light intensity, said phase managing mechanism controls said infrared touch screen to maintain the second phase; if the intensity of the ambient light received in said infrared receivers fixed on said first edge is larger than said standard ambient light intensity, said phase managing mechanism controls said infrared touch screen to terminate the second phase and enter into the first phase.

According to one aspect of the invention, the infrared light emitted from the infrared emitters fixed on any edge can be received by at least one infrared receiver fixed on the opposite edge.

According to one aspect of the invention, the height of the infrared emitters and infrared receivers fixed on the same edge is different or the same.

This invention also provides another infrared touch screen, comprising:

a touch detecting region;

a plurality of edges containing at least a first edge, a second edge, a third edge and a fourth edge, wherein the first edge and the second edge are opposite to each other, the third edge and the fourth edge are opposite to each other, there are infrared emitters and infrared receivers fixed on each of the first edge, the second edge, the third edge and the fourth edge; and a phase managing mechanism configured to control the phase alternation in said infrared touch screen which has a plurality of phases containing at least a third phase, a fourth phase, a fifth phase and a sixth phase;

wherein the phase managing mechanism controls the infrared emitters fixed on said first edge and the infrared receivers fixed on said second edge to scan said touch detecting region and controls the infrared emitters fixed on said third edge and the infrared receivers fixed on said fourth edge to scan said touch detecting region in said third phase;

the phase managing mechanism controls the infrared emitters fixed on said first edge and the infrared receivers fixed on said second edge to scan said touch detecting region and controls the infrared receivers fixed on said third edge and the infrared emitters fixed on said fourth edge to scan said touch detecting region in said fourth phase;

the phase managing mechanism controls the infrared receivers fixed on said first edge and the infrared emitters fixed on said second edge to scan said touch detecting region and controls the infrared receivers fixed on said third edge and the infrared emitters fixed on said fourth edge to scan said touch detecting region in said fifth phase; and the phase managing mechanism controls the infrared receivers fixed on said first edge and the infrared emitters fixed on said second edge to scan said touch detecting region and controls the infrared emitters fixed on said third edge and the infrared receivers fixed on said fourth edge to scan said touch detecting region in said sixth phase.

According to one aspect of the invention, a standard ambient light intensity is preset in said phase managing mechanism;

in said third phase, if the intensity of the ambient light received in the infrared receivers fixed on the second edge is not larger than said standard ambient light intensity, and the intensity of the ambient light received in the infrared receivers fixed on the fourth edge is not larger than said standard ambient light intensity, said phase managing mechanism controls said infrared touch screen to maintain the third phase; if the intensity of the ambient light received in the infrared receivers fixed on the second edge is larger than said standard ambient light intensity, and the intensity of the ambient light received in the infrared receivers fixed on the fourth edge is not larger than said standard ambient light intensity, said phase managing mechanism controls said infrared touch screen to terminate the third phase and enter into the sixth phase; if the intensity of the ambient light received in the infrared receivers fixed on the second edge is not larger than said standard ambient light intensity, and the intensity of the ambient light received in the infrared receivers fixed on the fourth edge is larger than said standard ambient light intensity, said phase managing mechanism controls said infrared touch screen to terminate the third phase and enter into the fourth phase; if the intensity of the ambient light received in the infrared receivers fixed on the second edge is larger than said standard ambient light intensity, and the intensity of the ambient light received in the infrared receivers fixed on the fourth edge is larger than said standard ambient light intensity, said phase managing mechanism controls said infrared touch screen to terminate the third phase and enter into the fifth phase;

in said fourth phase, if the intensity of the ambient light received in the infrared receivers fixed on the second edge is not larger than said standard ambient light intensity, and the intensity of the ambient light received in the infrared receivers fixed on the third edge is not larger than said standard ambient light intensity, said phase managing mechanism controls said infrared touch screen to maintain the fourth phase; if the intensity of the ambient light received in the infrared receivers fixed on the second edge is larger than said standard ambient light intensity, and the intensity of the ambient light received in the infrared receivers fixed on the third edge is not larger than said standard ambient light intensity, said phase managing mechanism controls said infrared touch screen to terminate the fourth phase and enter into the fifth phase; if the intensity of the ambient light received in the infrared receivers fixed on the second edge is not larger than said standard ambient light intensity, and the intensity of the ambient light received in the infrared receivers fixed on the third edge is larger than said standard ambient light intensity, said phase managing mechanism controls said infrared touch screen to terminate the fourth phase and enter into the third phase; if the intensity of the ambient light received in the infrared receivers fixed on the second edge is larger than said standard ambient light intensity, and the intensity of the ambient light received in the infrared receivers fixed on the third edge is larger than said standard ambient light intensity, said phase managing mechanism controls said infrared touch screen to terminate the fourth phase and enter into the sixth phase;

in said fifth phase, if the intensity of the ambient light received in the infrared receivers fixed on the first edge is not larger than said standard ambient light intensity, and the intensity of the ambient light received in the infrared receivers fixed on the third edge is not larger than said standard ambient light intensity, said phase managing mechanism controls said infrared touch screen to maintain the fifth phase; if the intensity of the ambient light received in the infrared receivers fixed on the first edge is larger than said standard ambient light intensity, and the intensity of the ambient light received in the infrared receivers fixed on the third edge is not larger than said standard ambient light intensity, said phase managing mechanism controls said infrared touch screen to terminate the fifth phase and enter into the fourth phase; if the intensity of the ambient light received in the infrared receivers fixed on the first edge is not larger than said standard ambient light intensity, and the intensity of the ambient light received in the infrared receivers fixed on the third edge is larger than said standard ambient light intensity, said phase managing mechanism controls said infrared touch screen to terminate the fifth phase and enter into the sixth phase; if the intensity of the ambient light received in the infrared receivers fixed on the first edge is larger than said standard ambient light intensity, and the intensity of the ambient light received in the infrared receivers fixed on the third edge is larger than said standard ambient light intensity, said phase managing mechanism controls said infrared touch screen to terminate the fifth phase and enter into the third phase; and in said sixth phase, if the intensity of the ambient light received in the infrared receivers fixed on the first edge is not larger than said standard ambient light intensity, and the intensity of the ambient light received in the infrared receivers fixed on the fourth edge is not larger than said standard ambient light intensity, said phase managing mechanism controls said infrared touch screen to maintain the sixth phase; if the intensity of the ambient light received in the infrared receivers fixed on the first edge is larger than said standard ambient light intensity, and the intensity of the ambient light received in the infrared receivers fixed on the fourth edge is not larger than said standard ambient light intensity, said phase managing mechanism controls said infrared touch screen to terminate the sixth phase and enter into the third phase; if the intensity of the ambient light received in the infrared receivers fixed on the first edge is not larger than said standard ambient light intensity, and the intensity of the ambient light received in the infrared receivers fixed on the fourth edge is larger than said standard ambient light intensity, said phase managing mechanism controls said infrared touch screen to terminate the sixth phase and enter into the fifth phase; if the intensity of the ambient light received in the infrared receivers fixed on the first edge is larger than said standard ambient light intensity, and the intensity of the ambient light received in the infrared receivers fixed on the fourth edge is larger than said standard ambient light intensity, said phase managing mechanism controls said infrared touch screen to terminate the sixth phase and enter into the fourth phase.

According to one aspect of the invention, the infrared light emitted from the infrared emitters fixed on any edge can be received by at least one infrared receiver fixed on the opposite edge.

According to one aspect of the invention, the height of the infrared emitters and infrared receivers fixed on the same edge is different or the same.

Other aspects or merits of the invention will be described in the following, and some of them are obvious in the following or can be learned during the realization of the invention.

DETAIL DESCRIPTION OF THE INVENTION

Next, the present invention is further described in connection with drawings and specific embodiments.

The following is the description of the embodiments with reference to the drawings, in which a same reference sign indicates a same component throughout the drawings.

Although some well known parts or components may be important for this invention, however, the following contents give no or simple description on them, and instead make out the characteristic structure of this invention in detail.

Figure 1:
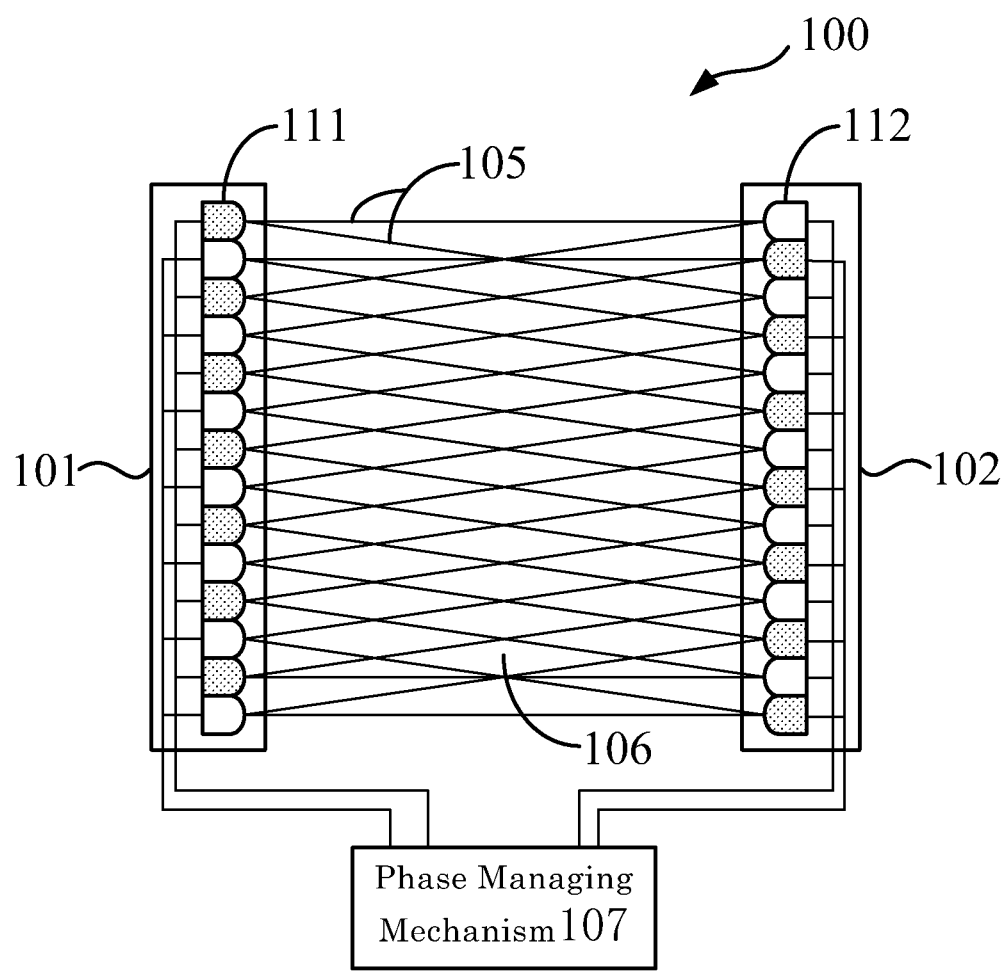
FIG. 1 is a block diagram of an infrared touch screen according to the conception of the invention.

FIG. 1 shows an infrared touch screen 100 according to one embodiment of the invention. Although more edges can exist than the shown, the infrared touch screen 100 is depicted comprising two edges, a first edge 101 and a second edge 102, wherein the first edge 101 and the second edge 102 are opposite to each other. There are infrared emitters 111 and infrared receivers 112 are fixed on the first edge 101, and there are also infrared emitters 111 and infrared receivers 112 fixed on the second edge 102. The infrared light emitted from each infrared emitter 111 fixed on the first edge 101 can be received by at least one infrared receiver 112 fixed on the second edge 102. Similarly, the infrared light emitted from each infrared emitter 111 fixed on the second edge 102 can be received by at least one infrared receiver 112 fixed on the first edge 101. Therefore, infrared paths 105 between infrared emitters 111 and infrared receivers 112 form an oblique-crossed infrared grid in touch detecting region 106 between the first edge 101 and the second edge 102. When a touch object (e.g. a finger of a user, a pen, etc.) touches the touch detecting region 106, at least two infrared paths are blocked. Since the locations the infrared emitter and receiver corresponding to a certain infrared path are fixed, the cross location of any two blocked infrared paths with different slope can be easily calculated according to similar triangles theorems. The cross location is deemed as the touch location, so the locating of the touch object is realized.

Figure 6:
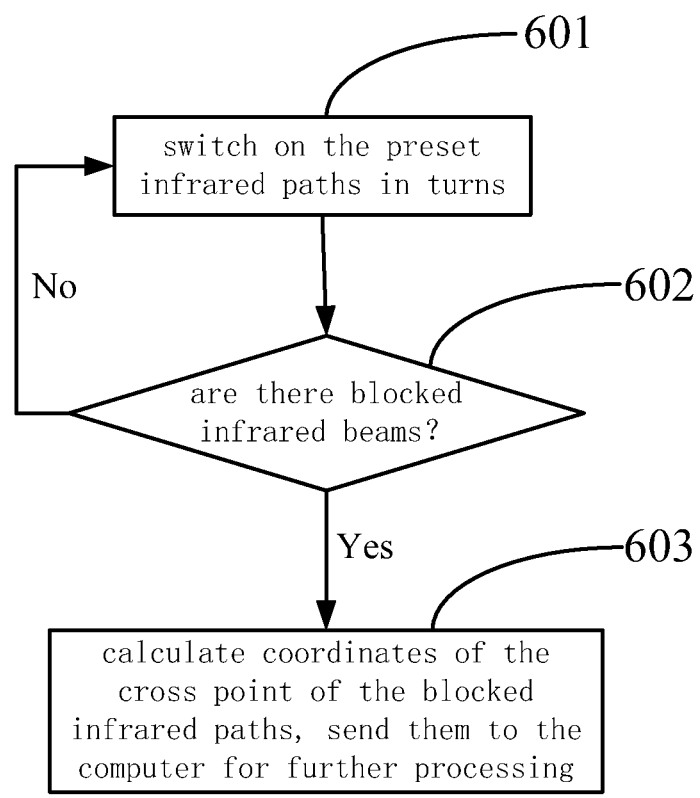
FIG. 6 is a flowchart of the touch locating method for the infrared touch screen in FIG. 1.

FIG. 6 shows the flowchart of the touch locating method for the infrared touch screen 100, comprising the following steps: firstly, the infrared touch screen is started up and all of the preset infrared paths are switched on at step 601.

At step 601, the infrared paths between all infrared emitters and their corresponding receivers are switched on in turn, and thus a crossed infrared grid is formed in the touch detecting region.

Infrared touch screen 100 executes this step. In the touch screen, the serial numbers of infrared emitters 111 on the first edge 101 are $i_1, i_2, i_3 \ldots i_n$ and the serial numbers of infrared receivers 112 are $r_1, r_2, r_3 \ldots r_n$. Accordingly, in this step, infrared paths $i_1 r_p, i_2 r_{p+1}, i_3 r_{p+2} \ldots i_{n+1-p} r_n, i_q r_1, i_{q+1} r_2, i_{q+2} r_3 \ldots i_n r_{n+1-q}$ are switched on in turns, and the crossed infrared grid is formed in the touch detecting region. The above n, p, q are natural numbers and p<n, q<n.

Then, whether there are blocked infrared paths is judged at step 602; if no, the process backs to step 601; if yes, the blocked infrared paths are recorded.

At step 602, if no infrared paths are blocked, which means there is no touch object in the touch detecting region, then the process backs to step 601 in which all infrared paths are switched on in turns again to detect the touch detecting region; if there are blocked infrared paths, which shows at least one touch object exists in the touch detecting region, then the coordinates of the infrared emitter and infrared receiver corresponding to the blocked infrared path are recorded.

Specifically, the infrared touch screen 100 executes this step in the following way. If no infrared paths are blocked when infrared paths $i_1 r_p, i_2 r_{p+1}, i_3 r_{p+2} \ldots i_{n+1-p} r_n, i_q r_1, i_{q+1} r_2, i_{q+2} r_3 \ldots i_n r_{n+1-q}$ are switched on in turns, it backs to step 601; if infrared paths $i_3 r_{p+2}, i_{q+4} r_5$ are blocked, then the coordinates of the infrared emitters $i_3, i_{q+4}$ and infrared receivers $r_{p+2}, r_5$ corresponding to the infrared paths i3rp+2, iq+4r5 are recorded.

Then the coordinates of the cross point between the blocked infrared paths are calculated at step 603, which coordinates are deemed as the coordinates of the touch object. Then the coordinate data are sent to the computer for further processing.

Figure 7:
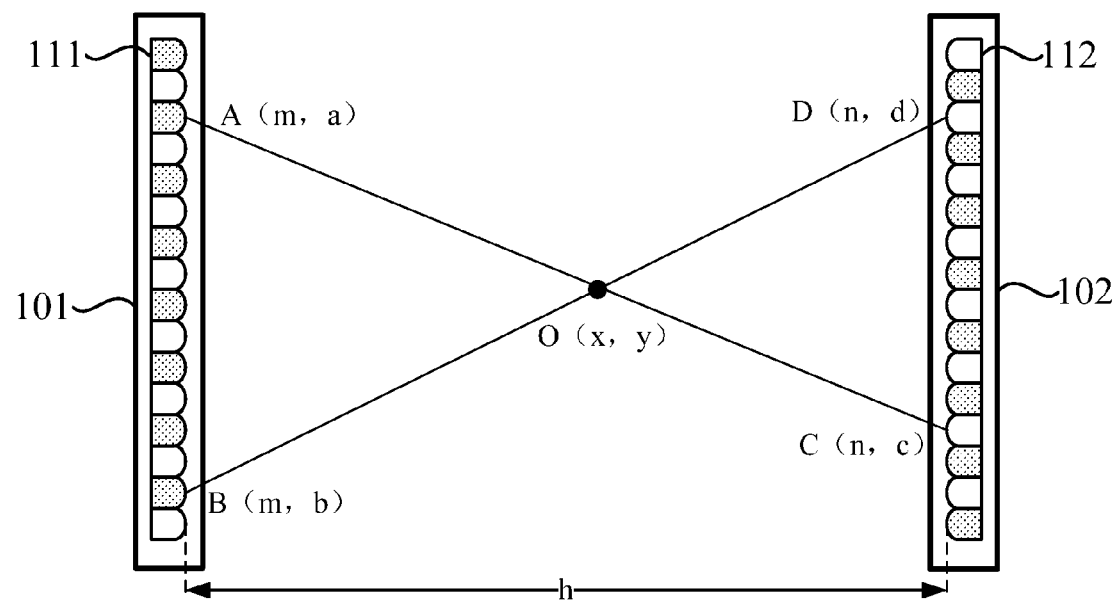
FIG. 7 is a scheme illustrating the formula for calculating the coordinates of the touch position in the touch locating method of FIG. 6.

Taking FIG. 7 as a reference, at step 603, two infrared paths AC, BD are selected randomly from the blocked infrared paths obtained at step 601, wherein the internal coordinates of the infrared emitter A corresponding to infrared path AC are (m, a) and the internal coordinates of the infrared receiver C corresponding to the infrared path AC are (n, c); the internal coordinates of the infrared emitter B corresponding to infrared path BD are (m, b) and the internal coordinates of the infrared receiver D corresponding to infrared path BD are (n, b). Meanwhile, c−a≠d−b should be true, that's AC and BD are crossed. Substituting the coordinates of the infrared emitters and receivers corresponding to the blocked infrared paths, i.e. A(m, a), C(n, c), B(m, b) and D(n, d), into formula $$x = \frac{an - bn + md - mc}{a - b + d - c}$$
$$y = \frac{ad - bc}{a - b + d - c}$$

the coordinates (x, y) of cross point O between blocked infrared paths AC and BD can be calculated. To reduce the calculating work and improve the responding speed, m=0 can be set. That's, the line where the infrared emitters are located is set as y-axis. Meanwhile, in the formula n=h can be set, wherein h is the distance between the line where the infrared emitters are located and the line where the infrared receivers are located. Then, the formula is simplified as $$x = \frac{a - b}{a - b + d - c} h$$
$$y = \frac{ad - bc}{a - b + d - c}.$$

Then the calculated coordinate data of cross point O, that's the coordinate data (x, y) of the touch object, are sent to a computer for further processing.

Specifically, the infrared touch screen 100 executes this step by substituting the coordinates of infrared emitters $i_3(0, 3)$, $i_{q+4}(0, q+4)$ and infrared receivers $r_{p+2}(h, p+2)$, $r_5(h, 5)$ into formula $$x = \frac{a-b}{a-b+d-c}h$$
$$y = \frac{ad-bc}{a-b+d-c}$$

to calculate $$x = \frac{q+1}{p+q-2}h, \; y = \frac{(q+4)(p+2)-15}{p+q-2},$$

and then sending the coordinates $$\left(\frac{q+1}{p+q-2} \cdot h, \; \frac{(q+4)(p+2)-15}{p+q-2}\right)$$

to the computer for further processing.

Figure 8:
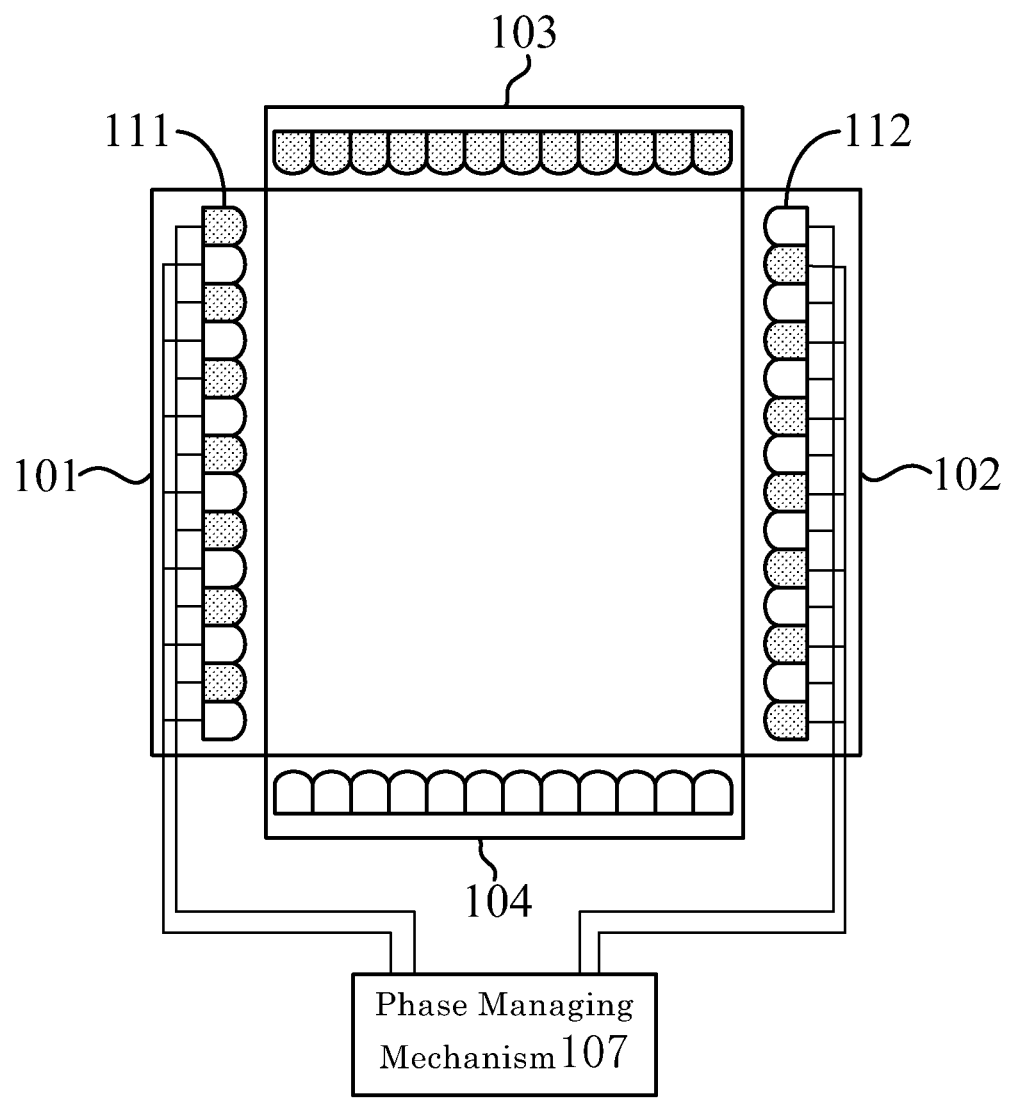
FIG. 8 is a block diagram showing optimization on the infrared touch screen of FIG. 1.
Figure 9A:
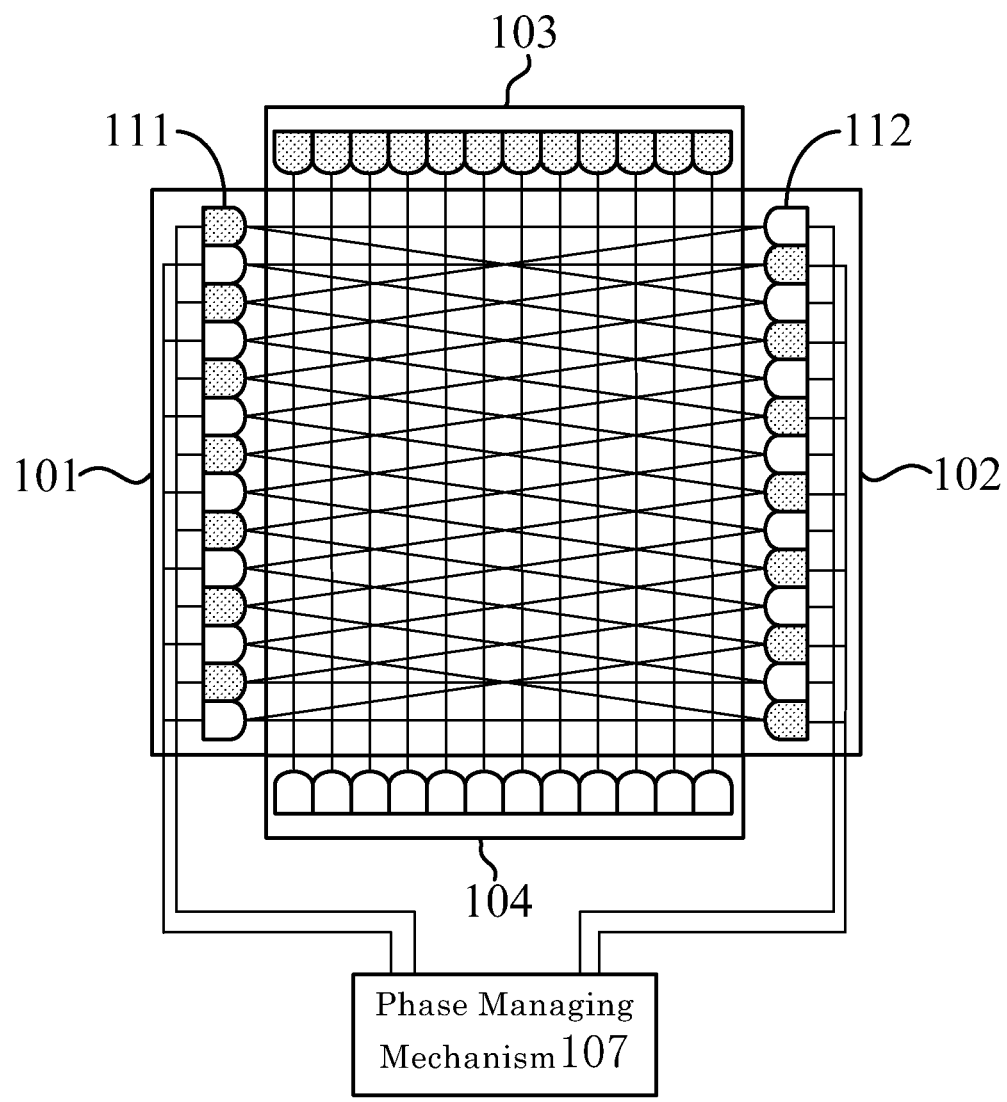
FIG. 9A shows one kind of infrared paths of the infrared touch screen of FIG. 8.
Figure 9B:
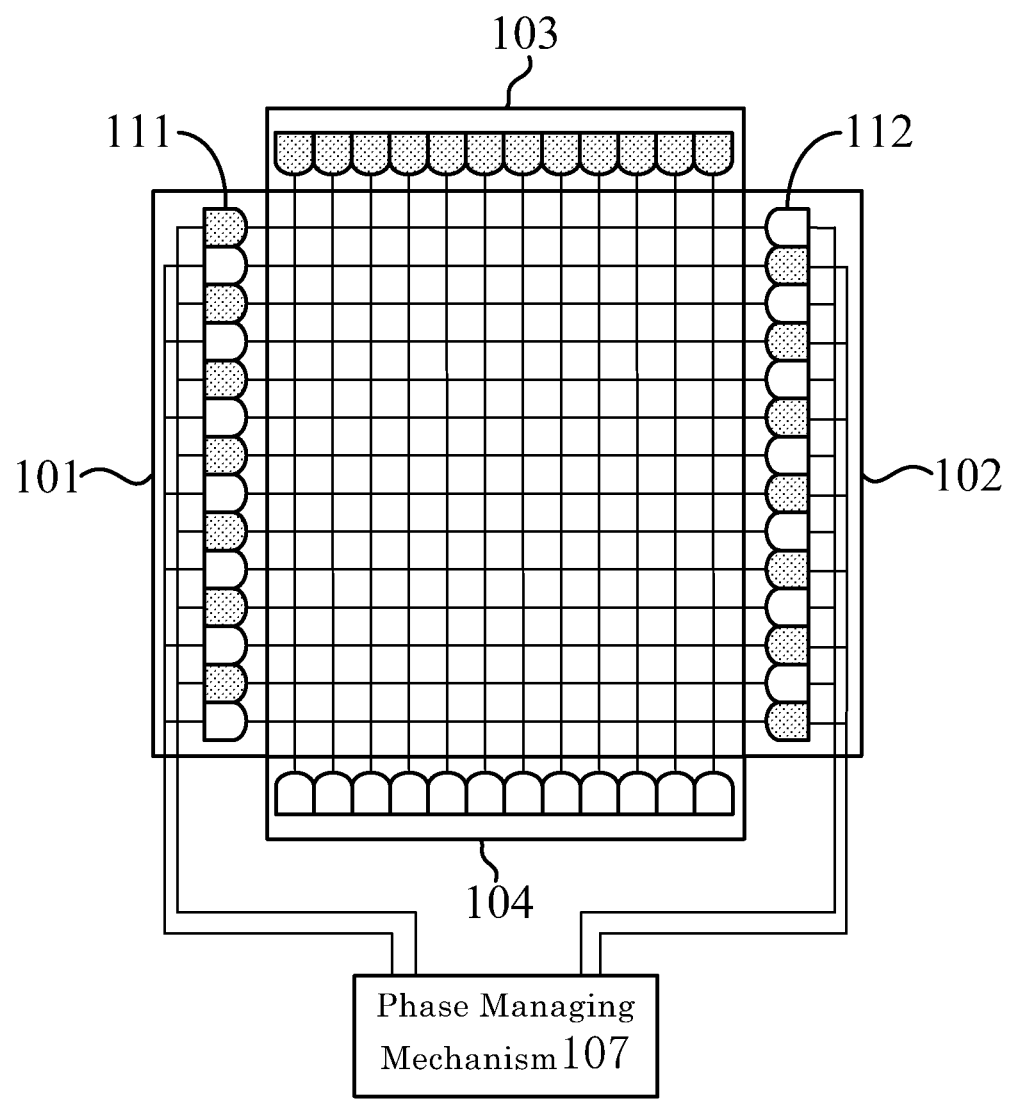
FIG. 9B shows another kind of infrared paths of the infrared touch screen of FIG. 8.
Figure 9C:
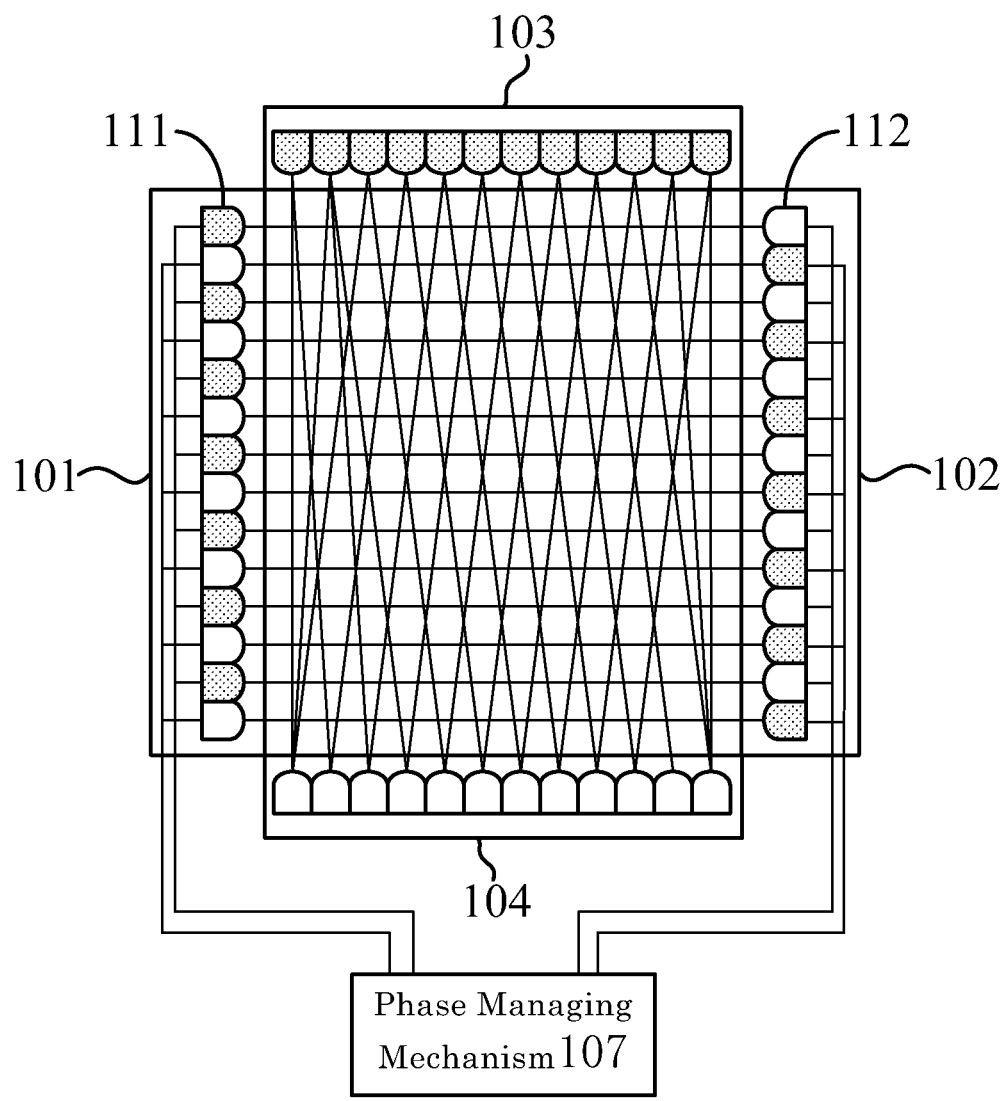
FIG. 9C shows a third kind of infrared paths of the infrared touch screen of FIG. 8.
Figure 9D:
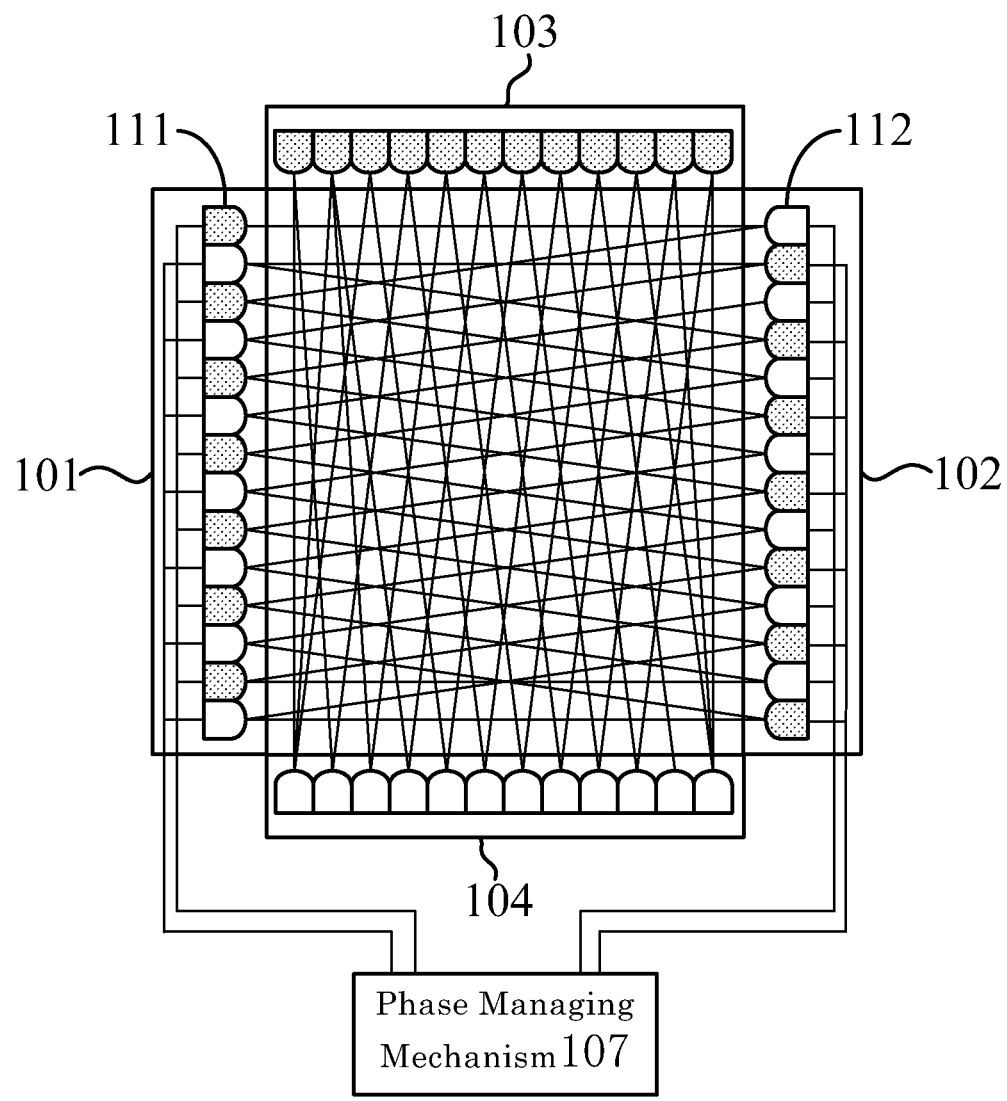
FIG. 9D shows a fourth kind of infrared paths of the infrared touch screen of FIG. 8.

In a certain practical application, ambient light which causes light interference to infrared touch screens is mainly the sunlight from the east and the west; therefore, the first edge 101 of infrared touch screen 100 can be placed at east or west relative to the second edge 102 so as to reduce light interference. What's more, to improve the detecting precise of the infrared touch screen 100, as shown in FIG. 8, the infrared touch screen 100 can further have a third edge 103 and a fourth edge 104, wherein the third edge 103 and the fourth edge 104 are opposite to each other, there are infrared emitters 111 fixed on the third edge 103, and there are infrared receivers 112 fixed on the fourth edge 104. The infrared light emitted from any infrared emitter 111 fixed on the third edge 103 can be received by at least one infrared receiver 112 fixed on the fourth edge 104. All infrared emitters 111 fixed on the third edge 103 can be replaced with infrared receivers 112, and correspondingly all infrared receivers 112 fixed on the fourth edge 104 can be replaced with infrared emitters 111. The infrared paths on the infrared touch screen of FIG. 8 can be designed as any of the infrared grids shown in FIG. 9A, FIG. 9B, FIG. 9C and FIG. 9D.

Figure 2:
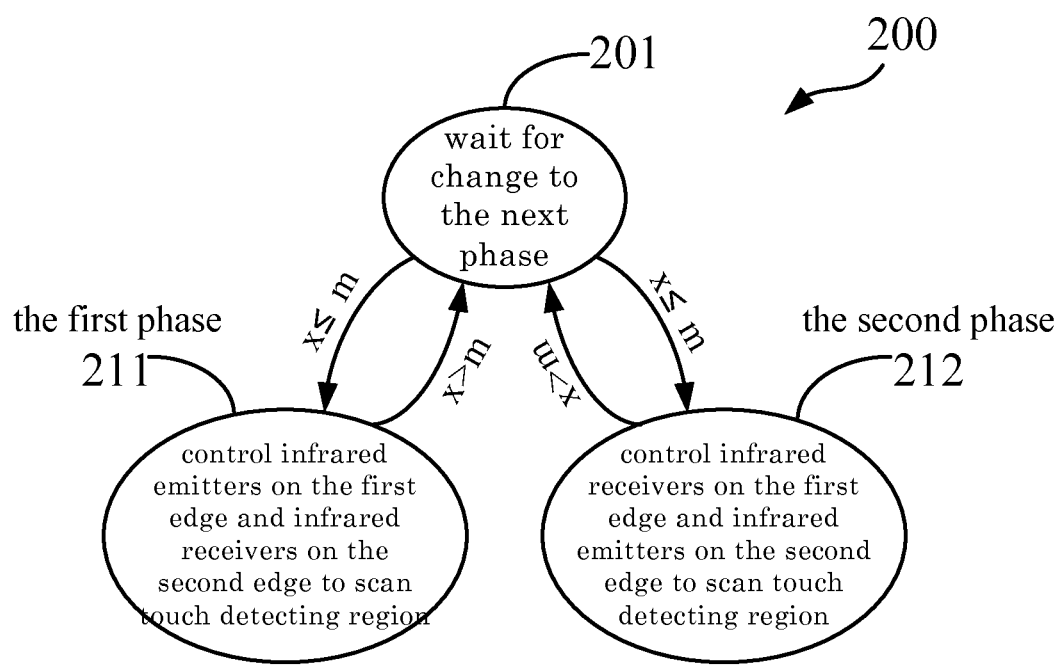
FIG. 2 is a state transition diagram illustrating the phase alternation in the infrared touch screen controlled by the phase managing mechanism of FIG. 1.

Infrared touch screen 100 also comprises a phase managing mechanism 107, which can control the phase alternation in infrared touch screen 100. State transition diagram 200 shown in FIG. 2 illustrates the exemplary operations of the phase managing mechanism 107 in infrared touch screen 100. In state 201, the phase managing mechanism 107 waits for the change to the next phase of the infrared touch screen and actually controls the change to the next phase at the proper time. Although the infrared touch screen 100 can have more phases, it's illustrated in FIG. 2 to only have a first phase 211 and a second phase 212. When switched into the first phase 211, the phase managing mechanism 107 controls infrared emitters 111 fixed on the first edge 101 and infrared receivers 112 fixed on the second edge 102 to scan the touch detecting region 106; and when switched into the second phase 212, the phase managing mechanism 107 controls infrared receivers 112 fixed on the first edge 101 and infrared emitters 111 fixed on the second edge 102 to scan the touch detecting region 106.

In the phase managing mechanism 107 of infrared touch screen 100, a standard ambient light intensity m is preset, and when the intensity X of the ambient light received in infrared receivers 112 is not larger than said standard ambient light intensity m (i.e. X≤m), the ambient light doesn't influence said infrared receivers to receive the infrared light emitted from the corresponding infrared emitters. The phase managing mechanism 107 can compare the detected intensity X of the received ambient light with the standard ambient light intensity m in real time in order to control the phase alternation. In the first phase 211, if the intensity $X_{102}$ of the ambient light received in infrared receivers 112 fixed on the second edge 102 is not larger than m ($X_{102}$≤m), the phase managing mechanism 107 controls infrared touch screen 100 to maintain the first phase 211; if the intensity $X_{102}$ of the ambient light received in infrared receivers 112 fixed on the second edge 102 is larger than m ($X_{101}$>m), the phase managing mechanism 107 controls infrared touch screen 100 to terminate the first phase 211 and enter into the second phase 212; in the second phase 212, if the intensity $X_{101}$ of the ambient light received in infrared receivers 112 fixed on the first edge 101 is not larger than m ($X_{101}$≤m), the phase managing mechanism 107 controls infrared touch screen 100 to maintain the second phase 212; if the intensity $X_{101}$ of the ambient light received in infrared receivers 112 fixed on the first edge 101 is larger than m ($X_{101}$>m), the phase managing mechanism 107 controls infrared touch screen 100 to terminate the second phase 212 and enter into the first phase 211. That is to say, if the intensity of the ambient light received in infrared receivers 112 fixed on the current receiving edge currently receiving the infrared is larger than the preset standard ambient light intensity, the phase managing mechanism changes the phase of the infrared touch screen 100. In a practical application, the phase managing mechanism 107 can be loaded into a microprocessor. With the change of structure and application of the phase managing mechanism, the infrared touch screen can effectively reduce or eliminate the light interference caused by the direction and intensity change of the ambient light (such as sunlight) along with the time and environment.

Figure 3:
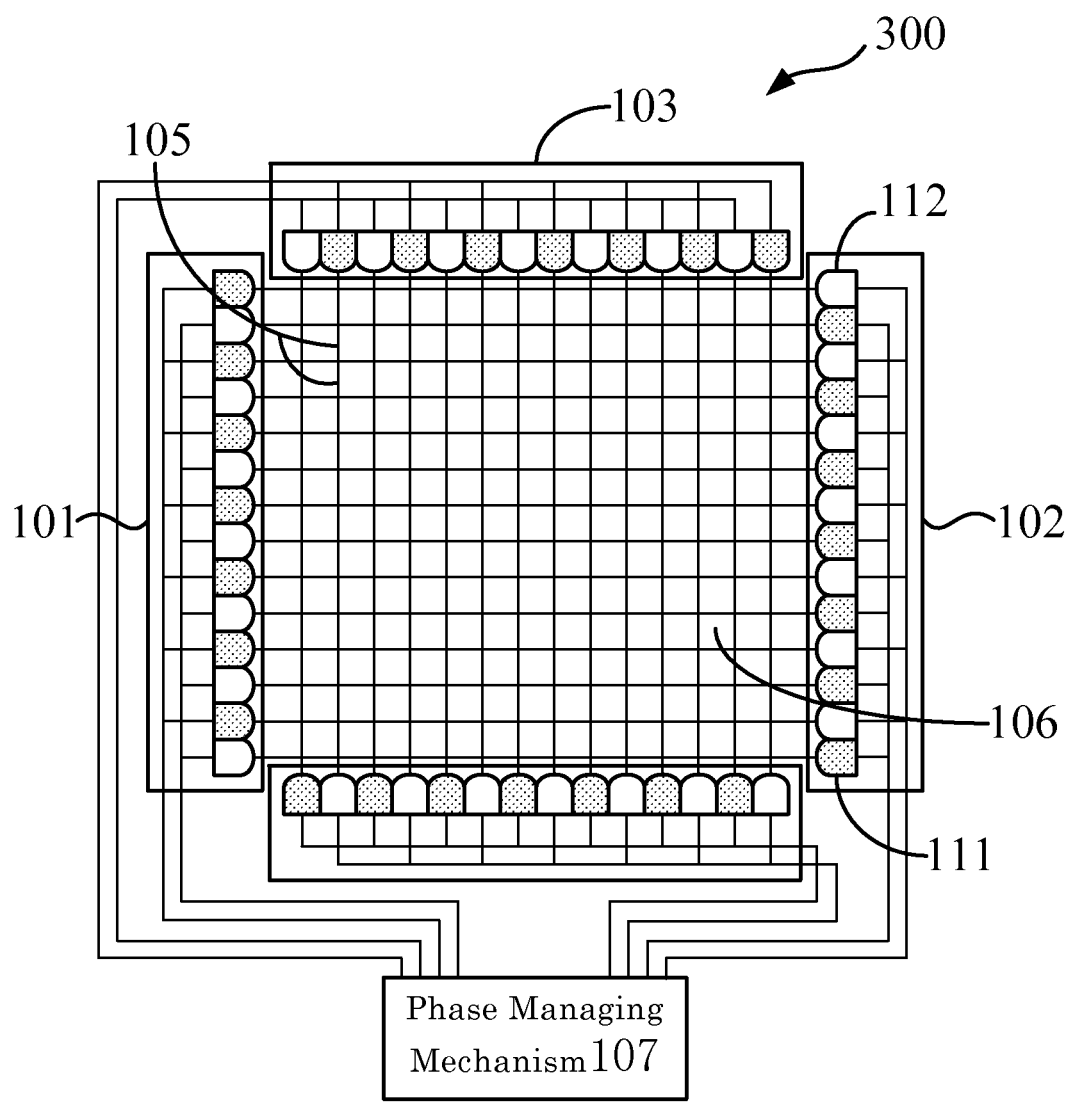
FIG. 3 is a block diagram of another infrared touch screen according to the conception of the invention.

FIG. 3 illustrates an infrared touch screen 300 according to another embodiment of the invention. Although it can have more edges than the shown, infrared touch screen 300 is illustrated as having four edges: a first edge 101, a second edge 102, a third edge 103 and a fourth edge 104, wherein the first edge 101 and the second edge 102 are opposite to each other, the third edge 103 and the fourth edge 104 are opposite to each other, and there are infrared emitters 111 and infrared receivers 112 fixed on each edge. The infrared light emitted from infrared emitters 111 fixed on any edge can be received by at least one infrared receiver 112 fixed on the opposite edge, which makes infrared paths 105 between infrared emitters 111 and infrared receivers 112 form a crossed or obliquecrossed infrared grid which can detect the touch position in touch detecting region 106 surrounded by these four edges. Preferably, as shown in FIG. 3 the infrared light emitted from an infrared emitter 111 fixed on any edge can be received by one infrared receiver 112 fixed on the opposite edge, such that infrared paths 105 between infrared emitters 111 and infrared receivers 112 form a crossed infrared grid which can detect the touch position in touch detecting region 106 surrounded by these four edges. Infrared touch screens using such structure have higher detecting precision.

Infrared touch screen 300 also has a phase managing mechanism 107, which can control the phase alternation in infrared touch screen 300. State transition diagram 200 shown in FIG. 4 illustrates the exemplary operations of the phase managing mechanism 107 in infrared touch screen 300.

Figure 4:
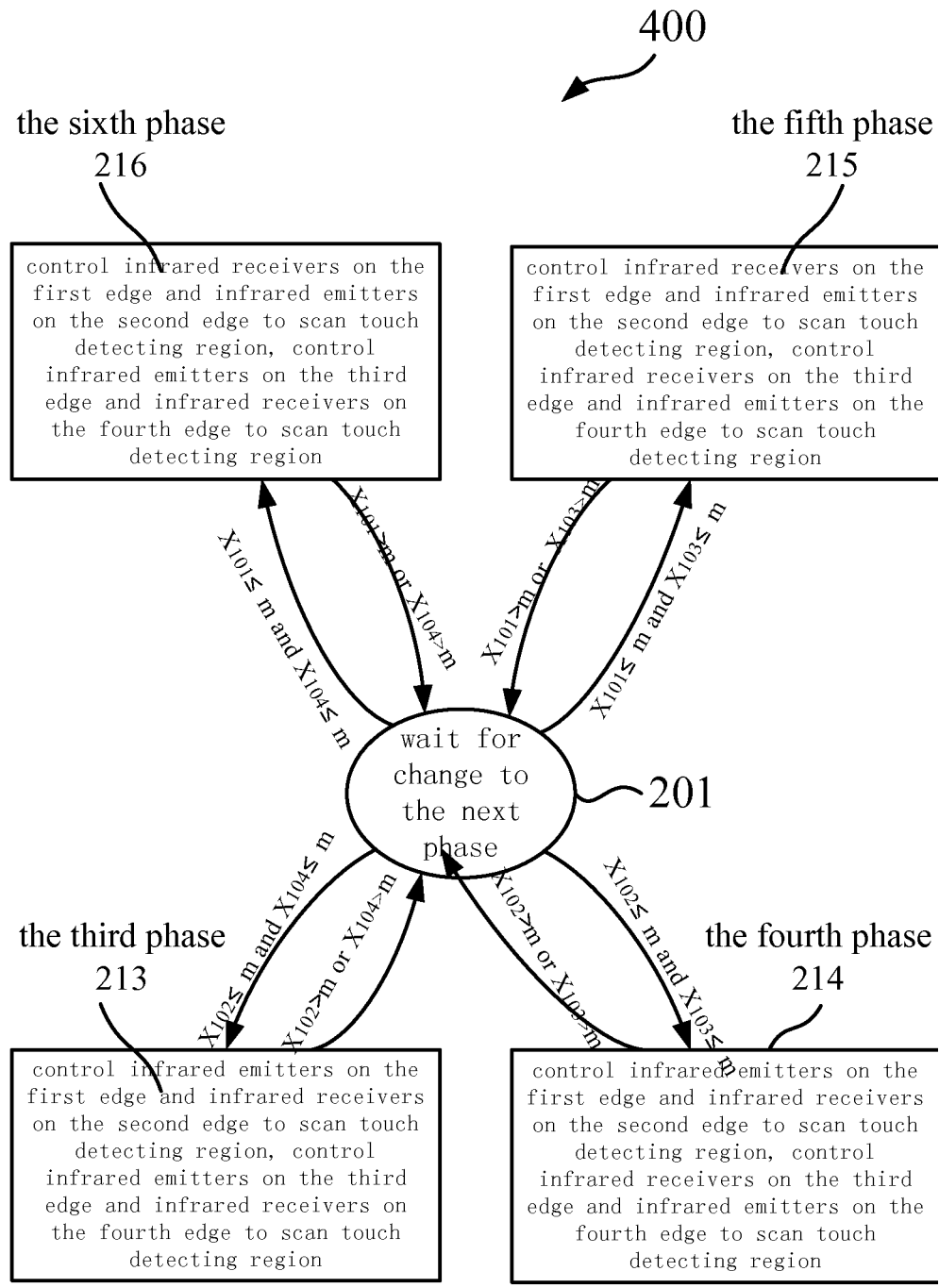
FIG. 4 is a state transition diagram illustrating the phase alternation in the infrared touch screen controlled by the phase managing mechanism of FIG. 3.

Although infrared touch screen 300 can have more phases, it's illustrated in FIG. 4 as only having a third phase 213, a fourth phase 214, a fifth phase 215 and a sixth phase 216. In state 201, the phase managing mechanism 107 waits for the change to the next phase of the infrared touch screen and actually controls the change to the next phase at the proper time. In the third phase 213, the phase managing mechanism 107 controls infrared emitters 111 fixed on said first edge 101 and infrared receivers 112 fixed on said second edge 102 to scan touch detecting region 106 and controls infrared emitters 111 fixed on said third edge 103 and infrared receivers 112 fixed on said fourth edge 104 to scan touch detecting region 106; in the fourth phase 214, it controls infrared emitters 111 fixed on said first edge 101 and infrared receivers 112 fixed on said second edge 102 to scan touch detecting region 106 and controls infrared receivers 112 fixed on said third edge 103 and infrared emitters 111 fixed on said fourth edge 104 to scan touch detecting region 106; in the fifth phase 215, it controls infrared receivers 112 fixed on said first edge 101 and infrared emitters 111 fixed on said second edge 102 to scan touch detecting region 106 and controls infrared receivers 112 fixed on said third edge 103 and infrared emitters 111 fixed on said fourth edge 104 to scan touch detecting region 106; and in the sixth phase 216, it controls infrared receivers 112 fixed on said first edge 101 and infrared emitters 111 fixed on said second edge 102 to scan touch detecting region 106 and controls infrared emitters 111 fixed on said third edge 103 and infrared receivers 112 fixed on said fourth edge 104 to scan touch detecting region 106. That is to say, under the control of the phase managing mechanism 107, the infrared touch screen 300 selects one of the first edge and the second edge as a emitting edge and the other as a receiving edge, and meanwhile selects on of the third edge and the fourth edge as a emitting edge and the other as a receiving edge, so as to form different phases by combination.

Meanwhile, in the phase managing mechanism 107 of infrared touch screen 300 a standard ambient light intensity m is also preset, and when the intensity X of the ambient light received in infrared receivers 112 is not larger than said standard ambient light intensity m (i.e. $X \leq m$), the ambient light doesn't influence said infrared receivers to receive the infrared light emitted from corresponding infrared emitters. The phase managing mechanism 107 can compare the detected intensity X of the received ambient light with the standard ambient light intensity m in real time in order to control the phase alternation. If the intensity of the ambient light received in infrared receivers 112 fixed on at least one of the current receiving edges is larger than the preset standard ambient light intensity, the phase managing mechanism changes the phase of the infrared touch screen 100, such that for each receiving edge, the infrared emitters fixed on the receiving edge and the infrared receivers fixed on the edge opposite to the receiving edge are controlled to scan the touch detecting region 106.

Specifically, in said third phase 213, if the intensity $X_{102}$ of the ambient light received in infrared receivers 112 fixed on the second edge 102 is not larger than m ($X_{102} \leq m$), and the intensity $X_{104}$ of the ambient light received in infrared receivers 112 fixed on the fourth edge 104 is not larger than m ($X_{104} \leq m$), the third phase 213 is maintained; if the intensity $X_{102}$ of the ambient light received in infrared receivers 112 fixed on the second edge 102 is larger than m ($X_{102} > m$), and the intensity $X_{104}$ of the ambient light received in infrared receivers 112 fixed on the fourth edge 104 is not larger than m ($X_{104} \leq m$), the third phase 213 is made to terminate and the sixth phase 216 is made to begin; if the intensity $X_{102}$ of the ambient light received in infrared receivers 112 fixed on the second edge 102 is not larger than m ($X_{102} \leq m$), and the intensity $X_{104}$ of the ambient light received in infrared receivers 112 fixed on the fourth edge 104 is larger than m ($X_{104} > m$), the third phase 213 is made to terminate and the fourth phase 214 is made to begin; if the intensity $X_{102}$ of the ambient light received in infrared receivers 112 fixed on the second edge 102 is larger than m ($X_{102} > m$), and the intensity $X_{102}$ of the ambient light received in infrared receivers 112 fixed on the fourth edge 104 is larger than m ($X_{103} > m$), the third phase 213 is made to terminate and the fifth phase 215 is made to begin.

In said fourth phase 214, if the intensity $X_{102}$ of the ambient light received in infrared receivers 112 fixed on the second edge 102 is not larger than m ($X_{102} \leq m$), and the intensity $X_{103}$ of the ambient light received in infrared receivers 112 fixed on the third edge 103 is not larger than m ($X_{103} \leq m$), the fourth phase 214 is maintained; if the intensity $X_{102}$ of the ambient light received in infrared receivers 112 fixed on the second edge 102 is larger than m ($X_{102} > m$), and the intensity $X_{103}$ of the ambient light received in infrared receivers 112 fixed on the third edge 103 is not larger than m ($X_{103} \leq m$), the fourth phase 214 is made to terminate and the fifth phase 215 is made to begin; if the intensity $X_{102}$ of the ambient light received in infrared receivers 112 fixed on the second edge 102 is not larger than m ($X_{102} \leq m$), and the intensity $X_{103}$ of the ambient light received in infrared receivers 112 fixed on the third edge 103 is larger than m ($X_{103} > m$), the fourth phase 214 is made to terminate and the third phase 213 is made to begin; if the intensity $X_{102}$ of the ambient light received in infrared receivers 112 fixed on the second edge 102 is larger than m ($X_{102} > m$), and the intensity $X_{102}$ of the ambient light received in infrared receivers 112 fixed on the third edge 103 is larger than m ($X_{103} > m$), the fourth phase 214 is made to terminate and the sixth phase 216 is made to begin.

In said fifth phase 215, if the intensity $X_{101}$ of the ambient light received in infrared receivers 112 fixed on the first edge 101 is not larger than m ($X_{101} \leq m$), and the intensity $X_{103}$ of the ambient light received in infrared receivers 112 fixed on the third edge 103 is not larger than m ($X_{103} \leq m$), the fifth phase 215 is maintained; if the intensity $X_{101}$ of the ambient light received in infrared receivers 112 fixed on the first edge 101 is larger than m ($X_{101} > m$), and the intensity $X_{103}$ of the ambient light received in infrared receivers 112 fixed on the third edge 103 is not larger than m ($X_{103} \leq m$), the fifth phase 215 is made to terminate and the fourth phase 214 is made to begin; if the intensity $X_{101}$ of the ambient light received in infrared receivers 112 fixed on the first edge 101 is not larger than m ($X_{101} \leq m$), and the intensity $X_{103}$ of the ambient light received in infrared receivers 112 fixed on the third edge 103 is larger than m ($X_{103} > m$), the fifth phase 215 is made to terminate and the sixth phase 216 is made to begin; if the intensity $X_{101}$ of the ambient light received in infrared receivers 112 fixed on the first edge 101 is larger than m ($X_{101} > m$), and the intensity $X_{103}$ of the ambient light received in infrared receivers 112 fixed on the third edge 103 is larger than m ($X_{103} > m$), the fifth phase 215 is made to terminate and the third phase 213 is made to begin.

In said sixth phase 216, if the intensity $X_{101}$ of the ambient light received in infrared receivers 112 fixed on the first edge 101 is not larger than m ($X_{101} \leq m$), and the intensity $X_{104}$ of the ambient light received in infrared receivers 112 fixed on the fourth edge 104 is not larger than m ($X_{104} \leq m$), the sixth phase 216 is maintained; if the intensity $X_{101}$ of the ambient light received in infrared receivers 112 fixed on the first edge 101 is larger than m ($X_{101} > m$), and the intensity $X_{104}$ of the ambient light received in infrared receivers 112 fixed on the fourth edge 104 is not larger than m ($X_{104} \leq m$), the sixth phase 216 is made to terminate and the third phase 213 is made to begin; if the intensity $X_{101}$ of the ambient light received in infrared receivers 112 fixed on the first edge 101 is not larger than m ($X_{101} \leq m$), and the intensity $X_{104}$ of the ambient light received in infrared receivers 112 fixed on the fourth edge 104 is larger than m ($X_{104} > m$), the sixth phase 216 is made to terminate and the fifth phase 215 is made to begin; if the intensity $X_{101}$ of the ambient light received in infrared receivers 112 fixed on the first edge 101 is larger than m ($X_{101} > m$), and the intensity $X_{104}$ of the ambient light received in infrared receivers 112 fixed on the fourth edge 104 is larger than m ($X_{104} > m$), the sixth phase 216 is made to terminate and the fourth phase 214 is made to begin.

In a practical application, the phase managing mechanism 107 can be loaded into a microprocessor. With the change of structure and the application of the phase managing mechanism, the infrared touch screen can effectively reduce or eliminate the light interference caused by the direction and intensity change of the ambient light (such as sunlight) along with the time and environment.

Figure 5A:
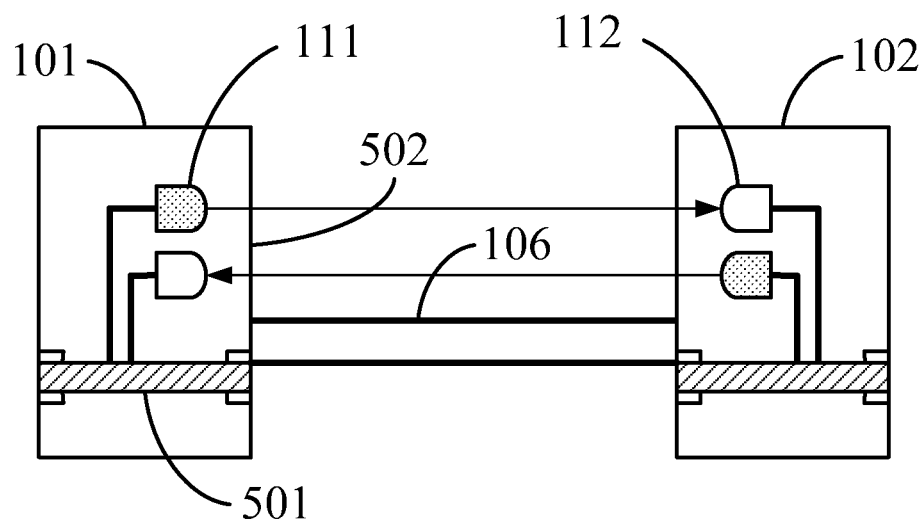
FIG. 5A is a section drawing showing one fixing type of infrared emitters and receivers in an infrared touch screen according to the invention.
Figure 5B:
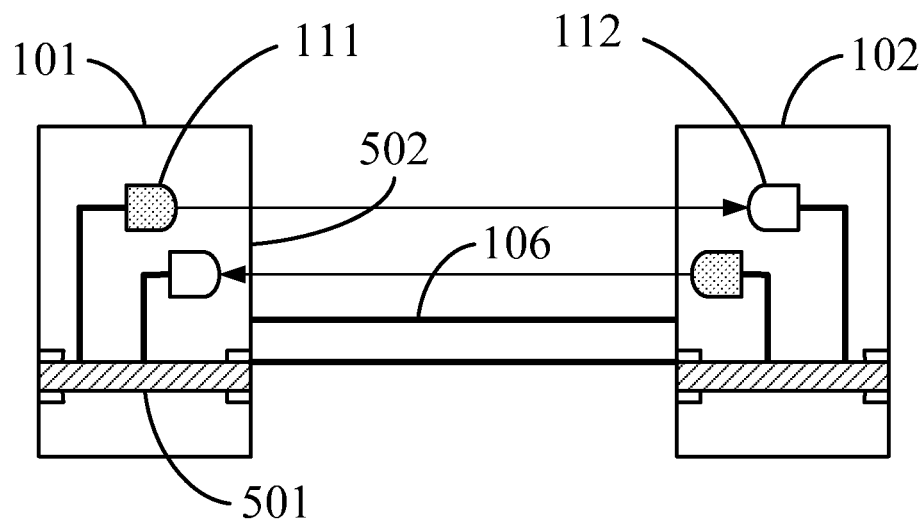
FIG. 5B is a section drawing showing another fixing type of infrared emitters and receivers in an infrared touch screen according to the invention.

In infrared touch screen 100 and 300, although infrared emitters 111 and infrared receivers 112 on the same edge can be fixed with the same height, infrared emitters 111 and infrared receivers 112 on the same edge illustrated in FIG. 5A and FIG. 5B are fixed with different height, wherein infrared emitters 103 in FIG. 5A are fixed directly over or under infrared receivers 112, and infrared emitters 103 in FIG. 5B are fixed slanting above or below infrared receivers 112. The lines connecting infrared emitters 111 and corresponding infrared receivers 112 in FIG. 5A and FIG. 5B are all in parallel with the touch detecting region 106. The leads of infrared emitters 111 and infrared receivers 112 are connected with a circuit board 501 fixed inside the edges. In front of infrared emitters 111 and infrared receivers 112 (oriented to touch detecting region 106), infrared light can pass through inner wall 502. This fixing manner can fix more infrared emitters and receivers on a same edge, and therefore improve the detecting precise of infrared touch screens. The two opposite edges in FIG. 5A and FIG. 5B are illustrated as the first edge 101 and the second edge 102.

The above-described embodiments are intended to be illustrative in all respects, rather than restrictive, of the invention. Those skilled in the art should recognize that the invention is capable of many variations and modifications within the scope and spirit of the present invention. The scope of the present invention is defined only by the appended claims.

The invention claimed is:

1. An infrared touch screen, comprising:
   a touch detecting region;
   a plurality of edges including at least a first edge and a second edge,
   wherein said first edge and said second edge are opposite to each other, said first edge having infrared emitters and infrared receivers fixed thereon, and said second edge having infrared emitters and infrared receivers fixed thereon; and
   a phase managing mechanism configured to control a phase alternation of said infrared touch screen which has a plurality of phases including at least a first phase and a second phase;
   wherein said phase managing mechanism controls the infrared emitters fixed on said first edge and the infrared receivers fixed on said second edge to scan said touch detecting region in said first phase; and
   said phase managing mechanism controls the infrared receivers fixed on said first edge and the infrared emitters fixed on said second edge to scan said touch detecting region in said second phase, and
   wherein a standard ambient light intensity is preset in said phase managing mechanism;
   in any of said first phase and said second phase, said phase managing mechanism compares an intensity of ambient light received in the infrared receivers fixed on a current receiving edge with said preset standard ambient light intensity;
   if the intensity of the ambient light received in the infrared receivers fixed on the current receiving edge is not larger than said preset standard ambient light intensity, said phase managing mechanism controls said infrared touch screen to maintain a current phase of the infrared touch screen; and
   if the intensity of the ambient light received in the infrared receivers fixed on the current receiving edge is larger than said preset standard ambient light intensity, said phase managing mechanism changes the phase of said infrared touch screen from said current phase to another one of said first phase and said second phase.

2. The infrared touch screen of claim 1, wherein said infrared touch screen further includes a third edge and a fourth edge, said third edge and said fourth edge are opposite to each other, said third edge having infrared emitters fixed thereon, and said fourth edge having infrared receivers fixed thereon.

3. The infrared touch screen of claim 1, wherein said infrared touch screen further includes a third edge and a fourth edge, said third edge and said fourth edge are opposite to each other, said third edge having infrared receivers fixed thereon, and said fourth edge having infrared emitters fixed thereon.

4. The infrared touch screen of claim 1, wherein infrared light emitted from the infrared emitters fixed on any of said first edge and said second edge can be received by at least one infrared receiver fixed on an opposite edge.

5. The infrared touch screen of claim 4, wherein heights of the infrared emitters and infrared receivers fixed on a same edge are different or the same.

6. An infrared touch screen, comprising:
   a touch detecting region;
   a plurality of edges including at least a first edge, a second edge, a third edge and a fourth edge, wherein said first edge and said second edge are opposite to each other, said third edge and said fourth edge are opposite to each other, each of said first edge, said second edge, said third edge, and said fourth edge having infrared emitters and infrared receivers fixed thereon; and
   a phase managing mechanism configured to control a phase alternation of said infrared touch screen which has a plurality of phases including at least a third phase, a fourth phase, a fifth phase and a sixth phase;
   wherein said phase managing mechanism controls the infrared emitters fixed on said first edge and the infrared receivers fixed on said second edge to scan said touch detecting region and controls the infrared emitters fixed on said third edge and the infrared receivers fixed on said fourth edge to scan said touch detecting region in said third phase;
   said phase managing mechanism controls the infrared emitters fixed on said first edge and the infrared receivers fixed on said second edge to scan said touch detecting region and controls the infrared receivers fixed on said third edge and the infrared emitters fixed on said fourth edge to scan said touch detecting region in said fourth phase;
   said phase managing mechanism controls the infrared receivers fixed on said first edge and the infrared emitters fixed on said second edge to scan said touch detecting region and controls the infrared receivers fixed on said third edge and the infrared emitters fixed on said fourth edge to scan said touch detecting region in said fifth phase; and said phase managing mechanism controls the infrared receivers fixed on said first edge and the infrared emitters fixed on said second edge to scan said touch detecting region and controls the infrared emitters fixed on said third edge and the infrared receivers fixed on said fourth edge to scan said touch detecting region in said sixth phase, wherein a standard ambient light intensity is preset in said phase managing mechanism;

in any of said third phase, said fourth phase, said fifth phase, and said sixth phase, said phase managing mechanism compares an intensity of ambient light received in the infrared receivers fixed on current receiving edges with said preset standard ambient light intensity;

if the intensity of ambient light received in the infrared receivers fixed on the current receiving edges is not larger than said preset standard ambient light intensity, said phase managing mechanism controls said infrared touch screen to maintain a current phase of the infrared touch screen; and if the intensity of ambient light received in the infrared receivers fixed on at least one of the current receiving edges is larger than said preset standard ambient light intensity, said phase managing mechanism changes the phase of said infrared touch screen from said current phase to another one of the third phase, the fourth phase, the fifth phase and the sixth phase.

7. The infrared touch screen of claim 6, wherein:

in said third phase,
  if an intensity of ambient light received in the infrared receivers fixed on the second edge is not larger than said preset standard ambient light intensity, and an intensity of ambient light received in the infrared receivers fixed on the fourth edge is not larger than said preset standard ambient light intensity, said phase managing mechanism controls said infrared touch screen to maintain the third phase;
  if the intensity of the ambient light received in the infrared receivers fixed on the second edge is larger than said preset standard ambient light intensity, and the intensity of the ambient light received in the infrared receivers fixed on the fourth edge is not larger than said preset standard ambient light intensity, said phase managing mechanism controls said infrared touch screen to terminate the third phase and enter into the sixth phase;
  if the intensity of the ambient light received in the infrared receivers fixed on the second edge is not larger than said preset standard ambient light intensity, and the intensity of the ambient light received in the infrared receivers fixed on the fourth edge is larger than said preset standard ambient light intensity, said phase managing mechanism controls said infrared touch screen to terminate the third phase and enter into the fourth phase;
  if the intensity of the ambient light received in the infrared receivers fixed on the second edge is larger than said preset standard ambient light intensity, and the intensity of the ambient light received in the infrared receivers fixed on the fourth edge is larger than said preset standard ambient light intensity, said phase managing mechanism controls said infrared touch screen to terminate the third phase and enter into the fifth phase;

in said fourth phase,
  if the intensity of the ambient light received in the infrared receivers fixed on the second edge is not larger than said preset standard ambient light intensity, and an intensity of ambient light received in the infrared receivers fixed on the third edge is not larger than said preset standard ambient light intensity, said phase managing mechanism controls said infrared touch screen to maintain the fourth phase;
  if the intensity of the ambient light received in the infrared receivers fixed on the second edge is larger than said preset standard ambient light intensity, and the intensity of the ambient light received in the infrared receivers fixed on the third edge is not larger than said preset standard ambient light intensity, said phase managing mechanism controls said infrared touch screen to terminate the fourth phase and enter into the fifth phase;
  if the intensity of the ambient light received in the infrared receivers fixed on the second edge is not larger than said preset standard ambient light intensity, and the intensity of the ambient light received in the infrared receivers fixed on the third edge is larger than said preset standard ambient light intensity, said phase managing mechanism controls said infrared touch screen to terminate the fourth phase and enter into the third phase;
  if the intensity of the ambient light received in the infrared receivers fixed on the second edge is larger than said preset standard ambient light intensity, and the intensity of the ambient light received in the infrared receivers fixed on the third edge is larger than said preset standard ambient light intensity, said phase managing mechanism controls said infrared touch screen to terminate the fourth phase and enter into the sixth phase;

in said fifth phase,
  if an intensity of ambient light received in the infrared receivers fixed on the first edge is not larger than said preset standard ambient light intensity, and the intensity of the ambient light received in the infrared receivers fixed on the third edge is not larger than said preset standard ambient light intensity, said phase managing mechanism controls said infrared touch screen to maintain the fifth phase;
  if the intensity of the ambient light received in the infrared receivers fixed on the first edge is larger than said preset standard ambient light intensity, and the intensity of the ambient light received in the infrared receivers fixed on the third edge is not larger than said preset standard ambient light intensity, said phase managing mechanism controls said infrared touch screen to terminate the fifth phase and enter into the fourth phase;
  if the intensity of the ambient light received in the infrared receivers fixed on the first edge is not larger than said preset standard ambient light intensity, and the intensity of the ambient light received in the infrared receivers fixed on the third edge is larger than said preset standard ambient light intensity, said phase managing mechanism controls said infrared touch screen to terminate the fifth phase and enter into the sixth phase;

if the intensity of the ambient light received in the infrared receivers fixed on the first edge is larger than said preset standard ambient light intensity, and the intensity of the ambient light received in the infrared receivers fixed on the third edge is larger than said preset standard ambient light intensity, said phase managing mechanism controls said infrared touch screen to terminate the fifth phase and enter into the third phase; and in said sixth phase, if the intensity of the ambient light received in the infrared receivers fixed on the first edge is not larger than said preset standard ambient light intensity, and the intensity of the ambient light received in the infrared receivers fixed on the fourth edge is not larger than said preset standard ambient light intensity, said phase managing mechanism controls said infrared touch screen to maintain the sixth phase;

if the intensity of the ambient light received in the infrared receivers fixed on the first edge is larger than said preset standard ambient light intensity, and the intensity of the ambient light received in the infrared receivers fixed on the fourth edge is not larger than said preset standard ambient light intensity, said phase managing mechanism controls said infrared touch screen to terminate the sixth phase and enter into the third phase;

if the intensity of the ambient light received in the infrared receivers fixed on the first edge is not larger than said preset standard ambient light intensity, and the intensity of the ambient light received in the infrared receivers fixed on the fourth edge is larger than said preset standard ambient light intensity, said phase managing mechanism controls said infrared touch screen to terminate the sixth phase and enter into the fifth phase;

if the intensity of the ambient light received in the infrared receivers fixed on the first edge is larger than said preset standard ambient light intensity, and the intensity of the ambient light received in the infrared receivers fixed on the fourth edge is larger than said preset standard ambient light intensity, said phase managing mechanism controls said infrared touch screen to terminate the sixth phase and enter into the fourth phase.

8. The infrared touch screen of claim 6, wherein infrared light emitted from the infrared emitters fixed on any of said first edge, said second edge, said third edge and said fourth edge can be received by at least one infrared receiver fixed on an opposite edge.

9. The infrared touch screen of claim 7, wherein heights of the infrared emitters and infrared receivers fixed on a same edge are different or the same.

* * * * *